United States Patent
He et al.

(10) Patent No.: US 11,757,089 B2
(45) Date of Patent: Sep. 12, 2023

(54) CARBON MATRIX COMPOSITE MATERIAL, PREPARATION METHOD THEREFOR AND LITHIUM ION BATTERY COMPRISING SAME

(71) Applicant: BTR NEW MATERIAL GROUP CO., LTD., Guangdong (CN)

(72) Inventors: Peng He, Guangdong (CN); Eming Guo, Guangdong (CN); Jianguo Ren, Guangdong (CN); Youyuan Huang, Guangdong (CN); Min Yue, Guangdong (CN)

(73) Assignee: BTR NEW MATERIAL GROUP CO., LTD., Guangdong (CN)

( * ) Notice: Subject to any disclaimer, the term of this patent is extended or adjusted under 35 U.S.C. 154(b) by 446 days.

(21) Appl. No.: 16/652,238

(22) PCT Filed: Sep. 30, 2018

(86) PCT No.: PCT/CN2018/109053
§ 371 (c)(1),
(2) Date: Mar. 30, 2020

(87) PCT Pub. No.: WO2019/063006
PCT Pub. Date: Apr. 4, 2019

(65) Prior Publication Data
US 2020/0243846 A1    Jul. 30, 2020

(30) Foreign Application Priority Data
Sep. 30, 2017    (CN) .......................... 201710923184.2

(51) Int. Cl.
H01M 4/36    (2006.01)
H01M 4/38    (2006.01)
(Continued)

(52) U.S. Cl.
CPC ............. *H01M 4/362* (2013.01); *H01M 4/38* (2013.01); *H01M 10/0525* (2013.01); *H01M 2004/027* (2013.01)

(58) Field of Classification Search
None
See application file for complete search history.

(56) References Cited

U.S. PATENT DOCUMENTS

2013/0216894 A1* 8/2013 Wang ................... H01G 11/34
                                                          429/188
2018/0342757 A1* 11/2018 Choi ..................... H01M 4/583

FOREIGN PATENT DOCUMENTS

CN    102332571    1/2012
CN    103708437    4/2014
(Continued)

OTHER PUBLICATIONS

Extended European Search Report issued in application No. 18862821.8, dated May 11, 2021 (date of completion of search Apr. 29, 2021).
(Continued)

*Primary Examiner* — Zhongqing Wei
(74) *Attorney, Agent, or Firm* — McCoy Russell LLP

(57) ABSTRACT

A carbon matrix composite material, a preparation method therefor and a battery comprising the same. The carbon matrix composite material comprises micron-sized soft carbon, micron-sized hard carbon, a nano-active material, a first carbon coating layer and a second carbon coating layer, wherein the first carbon coating layer is coated on a surface of the nano-active material to form composite particles; the composite particles are dispersed on the surfaces of the soft carbon and the hard carbon, and in the second carbon coating layer; and the second carbon coating layer coats soft carbon, the hard carbon and the composite particles.

10 Claims, 3 Drawing Sheets

(51) Int. Cl.
  *H01M 10/0525*   (2010.01)
  *H01M 4/02*     (2006.01)

(56) References Cited

FOREIGN PATENT DOCUMENTS

| | | | | |
|---|---|---|---|---|
| CN | 105406050 | A | 3/2016 | |
| CN | 105655564 | | 6/2016 | |
| CN | 106229479 | | 12/2016 | |
| CN | 107768626 | | 3/2018 | |
| EP | 2546908 | A2 | 1/2013 | |
| EP | 3103149 | | 8/2015 | |
| KR | 20150032014 | A | 3/2015 | |
| KR | 20150075207 | A * | 7/2015 | |
| KR | 20150075207 | A | 7/2015 | |
| WO | 2015/117838 | A1 | 8/2015 | |
| WO | 2016106487 | | 7/2016 | |
| WO | WO-2017099456 | A1 * | 6/2017 | .......... H01M 10/052 |

OTHER PUBLICATIONS

Office Action issued by the Korean Patent Office for Application No. 10-2020-7006459, dated Nov. 27, 2021.
International Search Report issued in related PCT/CN2018/109053, dated Jan. 2, 2019.

* cited by examiner

CARBON MATRIX COMPOSITE MATERIAL, PREPARATION METHOD THEREFOR AND LITHIUM ION BATTERY COMPRISING SAME

TECHNICAL FIELD

The present application belongs to the field of battery materials, and relates to a carbon-based composite material, a preparation method therefor and a use thereof in a lithium ion battery, for example, a high capacity rate type carbon-based composite material, a preparation method therefor and a lithium ion battery containing the same as an anode active material.

BACKGROUND

Lithium ion battery has the advantages such as high energy density, high working voltage and long cycle life, and therefore has wide application prospect in the field of electric automobiles. Amorphous carbon materials, including soft carbon which is easy to be graphitized and hard carbon which is difficult to be graphitized, are expected to be applied to electric automobiles because of their strong and stable macromolecular layer structure in which lithium ions can be rapidly deintercalated and thus their excellent rate capability. However, low capacity per gram and low first coulombic efficiency of the soft carbon and low first coulombic efficiency and low compacted density of the hard carbon material have limited the application thereof in lithium ion batteries.

Active metals, such as silicon, and metal oxides or metal alloy compounds thereof have relatively high specific capacity and first coulombic efficiency. However, these materials generally have defects of large volume expansion and poor cycle life. Though the expansion can be relieved to a certain extent and the cycle life can be improved through nanocrystallization, further optimization is still needed. Performing carbon coating on the nano-active substance can improve the conductivity of the nano-active substance and relieve its expansion. The carbon-coated nano-active substance can be uniformly dispersed on the surfaces of soft carbon and hard carbon, and thus the formation of a secondary particle can relieve the expansion of the nano-active substance while improve the energy density and the first coulombic efficiency of the soft carbon and the hard carbon. Meanwhile, the compounding of the hard carbon and soft carbon results in complementary advantages, which further improve the energy density of the material.

CN103708437A discloses a soft carbon anode material of a lithium ion battery and a preparation method thereof, which preparation method comprises the following steps: the soft carbon powder as a raw material is subjected to the processes of pre-sintering, nano-material spraying and carbon layer coating in sequence. Although the method improves the capacity and the first coulombic efficiency of the soft carbon material, the capacity and the efficiency of the material cannot be further improved due to the fact that the volume expansion of the nano-active substance is relatively large.

CN103311522A discloses a silicon/carbon composite microsphere anode material and a preparation method thereof, which preparation method comprises: silicon powder, soft carbon, carbon black, a soluble carbon-containing organic binder and a solvent in the formula amounts are mixed uniformly to obtain a slurry; the slurry is subjected to spray drying and carbonization to obtain the silicon/carbon composite microsphere anode material. As the hard carbon used in this method has been formed by carbonization of the soluble carbon-containing organic binder and pores are present in its interior, the material has relatively low first efficiency, large expansion of silicon powder and poor cycle performance.

Therefore, it is a technical problem to be solved urgently in the art to develop a carbon composite anode material which has high capacity, high first charge-discharge efficiency and while possesses excellent rate performance.

SUMMARY

The following is a brief summary of the subject matter that will be described in greater detail herein. The summary is not intended to be limiting as to the protection scope of the claims.

The purpose of the present application is to provide a high capacity rate type carbon-based composite material, a preparation method thereof and a use thereof as an anode active material in a lithium ion battery. The carbon-based composite material is very suitable as an anode active substance of a lithium ion battery, and has high capacity, high first charge-discharge efficiency and excellent rate performance.

For this purpose, the present application adopts the following technical solutions:

In a first aspect, the present application provides a carbon-based composite material comprising a micron-sized soft carbon, a micron-sized hard carbon, a nano-active substance, a first carbon coating layer and a second carbon coating layer; the first carbon coating layer is coated on the surface of the nano-active substance to form composite particles; the composite particles are dispersed on the surfaces of the soft carbon and the hard carbon and in the second carbon coating layer; and the second carbon coating layer is disposed to coat the soft carbon, the hard carbon and the composite particles.

In the present application, the second carbon coating layer is the outermost layer structure of the carbon-based composite material and is disposed to coat soft carbon, hard carbon and composite particles. The present carbon-based composite material has a secondary particle structure, and micron-sized soft carbon, micron-sized hard carbon, a nano-active substance, a first carbon coating layer and a second carbon coating layer together form the carbon-based composite material with a micro-nano structure; and through the cooperation of the first carbon coating layer and the second carbon coating layer and the reasonable design of the micro-nano structure, the capacity-exerting effect and the rate performance can be remarkably improved.

As an optional embodiment of the carbon-based composite material described herein, the ratio of the median particle diameter of the soft carbon to that of the hard carbon is 1:(1-3), e.g., 1:1, 1:1.3, 1:1.5, 1:1.8, 1:2.0, 1:2.5, or 1:3, and the like.

As an optional embodiment of the carbon-based composite material described herein, the carbon-based composite material contains the nano-active substance in a proportion of 1-60 wt %, the first carbon coating layer in a proportion of 0.2-15 wt %, the soft carbon in a proportion of 15-60 wt %, the hard carbon in a proportion of 15-60 wt %, and the second carbon coating layer in a proportion of 5-50 wt %. At these proportions, the coating effect of the composite particles formed by the nano-active substance and the first carbon coating layer on the surfaces of the soft carbon and the hard carbon is better, the coating effect of the first carbon coating layer and the second carbon coating layer is good, and the capacity-exerting effect is good.

In this optional embodiment, the nano-active substance is contained in a proportion of 1-60 wt %, e.g., 1 wt %, 5 wt %, 10 wt %, 12 wt %, 15 wt %, 20 wt %, 25 wt %, 30 wt %, 35 wt %, 38 wt %, 40 wt %, 45 wt %, 50 wt %, 55 wt %, or 60 wt %, and the like.

In this optional embodiment, the first carbon coating layer is contained in a proportion of 0.2-15 wt %, e.g., 0.2 wt %, 1 wt %, 3 wt %, 5 wt %, 10 wt %, 11 wt %, 12 wt %, 13 wt %, 14 wt %, or 15 wt %, and the like.

In this optional embodiment, the soft carbon is contained in a proportion of 15-60 wt %, e.g., 15 wt %, 20 wt %, 22.5 wt %, 25 wt %, 30 wt %, 35 wt %, 40 wt %, 45 wt %, 50 wt %, or 60 wt %, and the like.

In this optional embodiment, the hard carbon is contained in a proportion of 15-60 wt %, e.g., 15 wt %,18 wt %, 20 wt %, 25 wt %, 30 wt %, 35 wt %, 40 wt %, 45 wt %, 50 wt %, or 60 wt %, and the like.

In this optional embodiment, the second carbon coating layer is contained in a proportion of 5-50 wt %, e.g., 5 wt %, 10 wt %, 15 wt %, 18 wt %, 20 wt %, 25 wt %, 30 wt %, 35 wt %, 40 wt %, 45 wt %, or 50 wt %, and the like.

Optionally, in order to enable the composite particles to have better coating effects on the surfaces of soft carbon and hard carbon and to enable the first carbon coating layer and the second carbon coating layer to have better coating effects so that better capacity efficiency performance is achieved, the carbon-based composite material contains the nano-active substance in a proportion of 10-50 wt %, the first carbon coating layer in a proportion of 0.5-13 wt %, the soft carbon in a proportion of 20-50 wt %, the hard carbon in a proportion of 20-50 wt %, and the second carbon coating layer in a proportion of 10-40 wt %.

Optionally, in order to enable the composite particles to have better coating effects on the surfaces of soft carbon and hard carbon and to enable the first carbon coating layer and the second carbon coating layer to have better coating effects so that better capacity efficiency performance is achieved, the carbon-based composite material contains the nano-active substance in a proportion of 14-40 wt %, the first carbon coating layer in a proportion of 1-10 wt %, the soft carbon in a proportion of 20-45 wt %, the hard carbon in a proportion of 20-45 wt %, and the second carbon coating layer in a proportion of 15-35 wt %.

As an optional embodiment of the carbon-based composite material described herein, the nano-active material is a material that is electrochemically active to lithium, and may comprise any one selected from the group consisting of an active metal, a metal oxide, a metal alloy compound, and an active nonmetal, or a combination of at least two selected therefrom.

Optionally, the nano-active substance comprises any one selected from the group consisting of a silicon elementary substance, a tin elementary substance, an antimony elementary substance, a germanium elementary substance, an aluminum elementary substance, a magnesium elementary substance, a zinc elementary substance, a gallium elementary substance, a cadmium elementary substance, a titanium oxide, a silicon oxide, a tin oxide, a cobalt oxide, an iron oxide, a copper oxide, a manganese oxide, a nickel oxide, a tin-antimony alloy, an indium-antimony alloy, a silver-antimony alloy, an aluminum-antimony alloy, a silver-tin alloy, a silicon-iron alloy, a silicon-magnesium compound, and a silicon-iron compound, or a combination of at least two selected therefrom.

Optionally, the soft carbon comprises an amorphous carbon material which is easy to be graphitized after heat treatment at 800-3200° C., and can comprise any one selected from the group consisting of coke, carbon fibers, and mesocarbon microbeads, or a combination of at least two selected therefrom.

Optionally, the hard carbon comprises an amorphous carbon material which is difficult to be graphitized after heat treatment at 800-3200° C., and can comprise any one selected from the group consisting of a resin carbon, an organic polymer pyrolytic carbon, a plant hard carbon, and an asphalt hard carbon, or a combination of at least two selected therefrom.

Optionally, the median particle diameter of the carbon-based composite material is 1-45 μm, e.g., 1 μm, 3 μm, 5 μm, 10 μm, 15 μm, 20 μm, 25 μm, 30 μm, 32 μm, 36 μm, 40 μm, or 45 μm, and the like. The application effect of the material is better when the median particle diameter is within this range. It can be 5-25 μm, and can be 8-15 μm, so that a much better application effect is achieved.

Optionally, in the composite particle, the median particle diameter of the nano-active substance is 10-300 nm, e.g., 10 nm, 30 nm, 50 nm, 75 nm, 100 nm, 120 nm, 150 nm, 170 nm, 200 nm, 230 nm, 260 nm, or 300 nm, and the like, and can be 15-250 nm, further can be 20-200 nm.

Optionally, in the composite particle, the thickness of the first carbon coating layer is 0.1-1.5 μm, e.g., 0.1 μm, 0.3 μm, 0.5 μm, 0.8 μm, 1 μm, 1.1 μm, 1.2 μm, 1.3 μm, 1.4 μm, or 1.5 μm, and the like.

Optionally, the median particle diameter of the soft carbon is 1-30 μm, e.g., 1μm, 3μm, 5μm, 7 μm, 10 μm, 15 μm, 20 μm, 25 μm, or 30 μm, and the like, and can be 2-15 μm, further can be 3-9 μm.

Optionally, the median particle diameter of the hard carbon is 1-30 μm, e.g., 1 μm, 3.5 μm, 5 μm, 8 μm, 10 μm, 15 μm, 20 μm, 25 μm, or 30 μm, and the like, and can be 2-20 μm, further can be 3-13 μm.

In a second aspect, the present application provides a preparation method of the carbon-based composite material according to the first aspect, comprising the following steps:

(1) a nano-active substance is subjected to carbon coating so that composite particles, namely the carbon-coated nano-active substance, consisting of the nano-active substance and a first carbon coating layer are obtained;

(2) the composite particles are dispersed on the surfaces of soft carbon and hard carbon so that a first precursor is obtained;

(3) the first precursor is subjected to coating modification by using an organic substance so that a second precursor is obtained;

(4) the second precursor is subjected to conical-mixer (VC) hot mixing or kneading molding so that a third precursor is obtained; and (5) the third precursor is sintered at high temperature so that a carbon-based composite material is obtained.

In the present application, the coating modification in step (2) is homogeneous coating.

In the present application, performing the organic substance coating modification (namely homogeneous coating) of step (3) after combination of the composite particles, the soft carbon and the hard carbon of step (2) enables the composite particles to be effectively bonded onto the surfaces of the soft carbon and the hard carbon, and further inhibits of the expansion of the nano-active substances in the composite particles.

According to the present application, further performing VC hot mixing or kneading mixing molding of step (4) after the coating modification of step (3) enables fine soft carbon and hard carbon particles to be combined into secondary particles, and also enable a part of composite particles (namely carbon-coated nano-active substance) to be dispersed into an external carbon layer (namely a second carbon coating layer), thereby improving the specific capacity and rate capability.

As an optional technical solution of the method according to the present application, the method further comprises performing step (6) after step (5): the carbon-based composite material obtained in the step (5) is crushed, screened and demagnetized to obtain the carbon-based composite material.

Optionally, the median particle diameter of the carbon-based composite material obtained in step (6) is 1-45 μm, e.g., 1 μm, 5 μm, 10 μm, 15 μm, 18 μm, 20 μm, 25 μm, 30 μm, 35 μm, 40 μm, or 45 μm, and the like, and can be 5-25 μm, further can be 8-15 μm.

As an optional technical solution of the method according to the present application, the carbon coating in step (1) is homogeneous coating, and adopts a gas-phase coating method.

Optionally, the processing steps for preparing the composite particles by a gas-phase coating method comprise: the nano-active substance is placed in a reaction furnace, a protective gas is introduced, the temperature is raised to 500-1200° C., an organic carbon source gas is introduced, and the temperature is maintained, followed by natural cooling, thus the composite particles are obtained.

In this optional embodiment, the temperature is raised to 500-1200° C., e.g., 500° C., 600° C., 700° C., 750° C., 850° C., 900° C., 1000° C., 1100° C., or 1200° C., and the like.

Optionally, in the processing steps for preparing the composite particles, the nano-active material comprises a material that is electrochemically active to lithium, and may comprise any one selected from the group consisting of an active metal, a metal oxide, a metal alloy compound, and an active nonmetal, or a combination of at least two selected therefrom.

Optionally, in the processing steps for preparing the composite particles, the nano-active substance comprises any one selected from the group consisting of a silicon elementary substance, a tin elementary substance, an antimony elementary substance, a germanium elementary substance, an aluminum elementary substance, a magnesium elementary substance, a zinc elementary substance, a gallium elementary substance, a cadmium elementary substance, a titanium oxide, a silicon oxide, a tin oxide, a cobalt oxide, an iron oxide, a copper oxide, a manganese oxide, a nickel oxide, a tin-antimony alloy, an indium-antimony alloy, a silver-antimony alloy, an aluminum-antimony alloy, a silicon-iron alloy, a silver-tin alloy, a silicon-magnesium compound, and a silicon-iron compound, or a combination of at least two selected therefrom.

Optionally, in the processing steps for preparing the composite particles, the median particle diameter of the nano-active substance is 10-300 nm, and can be 15-250 nm, further can be 20-200 nm.

Optionally, in the processing steps for preparing the composite particles, the reaction furnace comprises a rotary furnace, and the rotating speed of the rotary furnace is 0.1-5 r/min, e.g., 0.1 r/min, 0.5 r/min, 1 r/min, 2 r/min, 2.5 r/min, 3 r/min, 4 r/min, or 5 r/min, and the like.

Optionally, in the processing step of preparing the composite particles, the protective gas comprises any one selected from the group consisting of nitrogen gas, helium gas, neon gas, argon gas, krypton gas, and xenon gas, or a combination of at least two selected therefrom.

Optionally, in the processing steps for preparing the composite particles, the temperature raising rate is 0.5-20° C./min, e.g., 0.5° C./min, 1° C./min, 3° C./min, 8° C./min, 10° C./min, 12° C./min, 15° C./min, 16° C./min, 18° C./min, or 20° C./min, and the like.

Optionally, in the processing steps for preparing the composite particles, the organic carbon source gas comprises any one selected from the group consisting of hydrocarbons, and 1-3 rings aromatic hydrocarbon derivatives, or a combination of at least two selected therefrom, and may comprise any one selected from the group consisting of methane, ethylene, acetylene, benzene, toluene, xylene, acetone, styrene, and phenol, or a combination of at least two selected therefrom. If the aforementioned gaseous substance is adopted, it can be introduced directly as an organic carbon source gas; if the aforementioned non-gaseous substance is adopted, it is necessary to convert it into a gaseous state before introducing it as an organic carbon source gas.

Optionally, in the processing steps for preparing the composite particles, the flow rate of the organic carbon source gas is 0.1-20 L/min, e.g., 0.1 L/min, 1 L/min, 3 L/min, 6 L/min, 10 L/min, 12 L/min, 15 L/min, 18 L/min, or 20 L/min, and the like.

Optionally, in the processing steps for preparing the composite particles, the duration time for maintaining the temperature is 0.1-10 h, e.g., 0.1 h, 1 h, 2 h, 3 h, 5 h, 6 h, 8 h, or 10 h, and the like.

As an optional technical solution of the method according to the present application, the soft carbon in step (2) comprises an amorphous carbon material which is easy to be graphitized after heat treatment at 800-3200° C., and can comprise any one selected from the group consisting of coke, carbon fibers, and mesocarbon microbeads, or a combination of at least two selected therefrom.

Optionally, the median particle diameter of the soft carbon in step (2) is 1-30 μm, and can be 2-15 μm, further can be 3-9 μm.

Optionally, the hard carbon in step (2) comprises an amorphous carbon material which is difficult to be graphitized after heat treatment at 800-3200° C., and can comprise any one selected from the group consisting of a resin carbon, an organic polymer pyrolytic carbon, a plant hard carbon, and asphalt hard carbon, or a combination of at least two selected therefrom.

Optionally, the median particle diameter of the hard carbon in step (2) is 1-30 μm, and can be 2-20 μm, further can be 3-13 μm.

Optionally, the method used for the dispersing in step (2) includes a coating method, and may include any one selected from the group consisting of a liquid-phase coating method and a solid-phase coating method.

Optionally, the processing steps of the liquid-phase coating method comprise: the composite particles, a dispersant, the soft carbon and the hard carbon are dispersed into an organic solvent system, then the mixture is dried, and thus the first precursor is obtained.

Optionally, in the processing steps of the liquid-phase coating method, the dispersant comprises any one selected from the group consisting of sodium tripolyphosphate, sodium hexametaphosphate, sodium pyrophosphate, triethylhexylphosphoric acid, sodium dodecyl sulfate, methylpentanol, a cellulose derivative, polyacrylamide, guar gum, fatty acid polyethylene glycol ester, hexadecyl trimethyl ammonium bromide, polyethylene glycol p-isooctylphenyl ether, polyacrylic acid, polyvinylpyrrolidone, polyoxyethylene sorbitan monooleate, p-ethylbenzoic acid, and polyetherimide, or a combination of at least two selected therefrom.

Optionally, in the processing steps of the liquid-phase coating method, the organic solvent system comprises any one selected from the group consisting of alcohol, ketone, and ether, or a combination of at least two selected therefrom.

Optionally, in the processing steps of the liquid-phase coating method, the mode of drying comprises any one selected from the group consisting of spray drying and rotary evaporation drying.

Optionally, the processing steps of the solid-phase coating method comprise: the composite particles, the soft carbon and the hard carbon are placed into a fusion machine for fusion, thus the first precursor is obtained.

Optionally, in the processing steps of the solid-phase coating method, the rotating speed during the fusion is 500-3000 r/min, e.g., 500 r/min, 750 r/min, 850 r/min, 1000 r/min, 1200 r/min, 1300 r/min, 1500 r/min, 1600 r/min, 1750 r/min, 1850 r/min, 2000 r/min, 2200 r/min, 2350 r/min, 2600 r/min, 2800 r/min, or 3000 r/min, and the like.

Optionally, in the processing steps of the solid-phase coating method, the cutter gap width during the fusion is 0.01-0.5 cm, e.g., 0.01 cm, 0.05 cm, 0.1 cm, 0.15 cm, 0.2 cm, 0.3 cm, 0.35 cm, 0.4 cm, or 0.5 cm, and the like.

Optionally, in the processing steps of the solid-phase coating method, the duration time for the fusion is at least 0.5 h.

As an optional technical solution of the method according to the present application, the organic substance in step (3) comprises any one selected from the group consisting of a polymer, a saccharide, an organic acid, asphalt, and a polymer material, or a combination of at least two selected therefrom, but is not limited to the organic substances listed above.

Optionally, the organic substance in step (3) is in a powder form, and the median particle diameter thereof is 0.1-25 μm, e.g., 0.1 μm, 1 μm, 3.5 μm, 6 μm, 10 μm, 15 μm, 20 μm, or 25 μm, and the like, and can be 0.5-8 μm.

Optionally, the method used for the coating modification in step (3) includes any one selected from the group consisting of a liquid-phase coating modification method and a solid-phase coating modification method.

Optionally, the processing steps of the liquid-phase coating modification method comprise: the first precursor and the organic substance are dispersed in an organic solvent system, then the mixture is dried, and thus the coating modification is realized and the second precursor is obtained.

Optionally, in the processing steps of the liquid-phase coating modification method, the organic solvent system comprises any one selected from the group consisting of ether, alcohol, and ketone, or a combination of at least two selected therefrom.

Optionally, in the processing steps of the liquid-phase coating modification method, the mode of drying comprises any one selected from the group consisting of spray drying and rotary evaporation drying.

Optionally, the processing steps of the solid-phase coating modification method comprise: the first precursor and the organic substance are placed in a VC high-efficiency mixer for VC mixing, thus the second precursor is obtained.

Optionally, in the processing steps of the solid-phase coating modification method, the rotating speed is adjusted to be 500-3000 r/min during the VC mixing, e.g., 500 r/min, 650 r/min, 800 r/min, 1000 r/min, 1200 r/min, 1500 r/min, 2000 r/min, 2300 r/min, 2600 r/min, or 3000 r/min, and the like.

Optionally, in the processing steps of the solid-phase coating modification method, the temperature for the VC mixing is 100-700° C., e.g., 100° C., 200° C., 300° C., 350° C., 400° C., 500° C., 600° C., or 700° C., and the like.

Optionally, in the processing steps of the solid-phase coating modification method, the duration time for the VC mixing is at least 0.5 h.

Optionally, the processing temperature for the VC hot mixing or kneading molding in step (4) is 50-400° C., e.g., 50° C., 70° C., 80° C., 100° C., 125° C., 150° C., 200° C., 220° C., 240° C., 280° C., 300° C., 325° C., 350° C., or 400° C., and the like; and the processing time is 0.01-4 h, e.g., 0.01 h, 0.05 h, 0.1 h, 0.5 h, 1 h, 1.5 h, 2 h, 2.5 h, 3 h, or 4 h, and the like.

As an optional technical solution of the method according to the present application, the sintering at high temperature in step (5) comprises: the third precursor is placed in a reactor, a protective gas is introduced, the temperature is raised to 500-1200° C. and maintained, followed by natural cooling, thus the carbon-based composite material is obtained.

In this optional embodiment, the temperature is raised to 500-1200° C., e.g., 500° C., 650° C., 750° C., 800° C., 900° C., 1000° C., 1100° C., or 1200° C., and the like.

Optionally, during the sintering at high temperature in step (5), the reactor comprises any one selected from the group consisting of a vacuum furnace, a box furnace, a rotary furnace, a roller kiln, a pushed slab kiln and a tubular furnace.

Optionally, during the sintering at high temperature in step (5), the protective gas comprises any one selected from the group consisting of nitrogen gas, helium gas, neon gas, argon gas and xenon gas, or a combination of at least two selected therefrom.

Optionally, during the sintering at high temperature in step (5), the temperature raising rate is 0.5-20° C./min, e.g., 0.5° C./min, 1° C./min, 3° C./min, 6° C./min, 10° C./min, 12° C./min, 13° C./min, 15° C./min, 17° C./min, 18° C./min, or 20° C./min, and the like.

Optionally, during the sintering at high temperature in step (5), the duration time for maintaining the temperature is 0.5-10 h, e.g., 0.5 h, 1 h, 2 h, 3 h, 5 h, 6 h, 8 h, or 10 h, and the like.

As an optional technical solution of the present application, the method comprises the following steps:

(1) preparation of composite particles:

a nano-active substance is placed in a rotary furnace, the rotary speed is adjusted to be 0.1-5 r/min, a protective gas is introduced, then the temperature is raised to 500-1200° C. at a temperature raising rate of 0.5-20° C./min, an organic carbon source gas is introduced at a flow rate of 0.1-20 L/min, and the temperature is maintained for 0.1-10 h, followed by natural cooling to room temperature, thus composite particles consisting of the nano-active substance and a first carbon coating layer are obtained;

(2) preparation of a first precursor:

the composite particles, a dispersant, a soft carbon and a hard carbon are dispersed into an organic solvent system, and the mixture is spray dried, thus a first precursor is obtained;

alternatively, the composite particles, a soft carbon and a hard carbon are placed in a fusion machine, the rotating speed is adjusted to be 500-3000 r/min, the cutter gap width is adjusted to be 0.01-0.5 cm, and fusion is conducted for at least 0.5 h, thus the first precursor is obtained;

(3) preparation of a second precursor:

the first precursor and an organic substance are dispersed in an organic solvent system, the mixture is spray dried, thus a second precursor is obtained;

alternatively, the first precursor and an organic substance are placed in a VC high-efficiency mixer, the rotating speed is adjusted to be 500-3000 r/min, and VC mixing is conducted for at least 0.5 h, thus a second precursor is obtained;

(4) the second precursor is subjected to VC hot mixing or kneading molding treatment, wherein the processing temperature is 50-400° C., and the processing time is 0.01-4 h, so that a third precursor is obtained;

(5) the third precursor is placed in a reactor, a protective gas is introduced, the temperature is raised to 500-1200° C. at a temperature raising rate of 0.5-20° C./min and maintained for 0.5-10 h, followed by natural cooling to room temperature, then it is crushed, screened and demagnetized, thus a carbon-based composite material is obtained.

In a third aspect, the present application provides a lithium ion battery, the anode active material of which comprises the carbon-based composite material of the first aspect.

As compared to the related technologies, the present application has the following beneficial effects:

(1) In the present application, soft carbon and hard carbon are adopted as primary particles, carbon-coated nanometer active material (namely the composite particle formed by coating nano-active material with the first carbon coating layer) is dispersed on the surfaces of the soft carbon and the hard carbon, then an organic substance is homogeneously coated on the surface of the particles; through VC heating or kneading molding, sintering, a carbon-based composite material having secondary particle structure is obtained; the carbon-based composite material has reasonably designed micro-nano structure, stable structure and compact interior, is particularly suitable for use as the high-performance anode active material, and can commendably exert the capacity advantage and inhibit the volume expansion during cycling.

(2) According to the present application, performing carbon coating on the nano-active substance can improve the conductivity of the nano-active substance and relieve its expansion; the carbon-coated nano-active substance is uniformly dispersed on the surfaces of soft carbon and hard carbon, and through subsequent coating modification and sintering, the carbon-coated nano-active substance can also be dispersed into the external carbon coating layer (namely the second carbon coating layer); the formation of the final carbon-based composite material with a secondary particle structure can relieve the expansion of the nano-active substance, and improve the energy density and the first coulombic efficiency of the soft carbon and the hard carbon, meanwhile, the compounding of the micro-scale hard carbon and soft carbon and the nano-scale carbon coated nano-active substance results in complementary advantages, which further improves the energy density of the material; homogeneous coating can effectively bond the carbon-coated nano active substance on the surfaces of soft carbon and hard carbon and inhibit the expansion of the nano-active substances; VC heating or kneading molding enables fine soft carbon and hard carbon particles to be combined into secondary particles, so that the carbon-coated nano-active substance is distributed between the soft carbon and the hard carbon particles and in the external carbon coating layer, which further inhibits the expansion of the nano-active substance.

(3) In addition, the carbon composite anode material is simple in preparation process, low in raw material cost, environment-friendly and pollution-free.

Other aspects will be apparent upon reading and understanding the drawings and detailed description.

DETAILED DESCRIPTION

The technical solution of the present application is further illustrated below by the specific embodiments in combination with the appended drawings.

EXAMPLE 1

(1) Si with a particle size of 30-120 nm was placed in a rotary furnace, the rotary speed was adjusted to be 1 r/min, nitrogen gas was introduced, the temperature was raised to 800° C. at a temperature raising rate of 0.5° C./min, acetylene gas was introduced at a flow rate of 1.5 L/min, the temperature was maintained for 1 h, followed by natural cooling to room temperature, thus a carbon-coated nano-active substance, namely the composite particles consisting of the nano-active substance and a first carbon coating layer, was obtained;

(2) coke with a median particle diameter of 3-5 μm, plant hard carbon with a median particle diameter of 5-7 μm and the carbon-coated nano-active substance were placed in a fusion machine in a mass ratio of 40:40:20, the rotating speed was adjusted to be 2500 r/min, the cutter gap width was set to be 0.1 cm, fusion was conducted for 1 h, thus a first precursor was obtained;

(3) the first precursor and asphalt powder with a particle size of 0.5-10 μm were placed in a VC high-efficiency mixer in a mass ratio of 70:30 where the rotating speed was adjusted to be 1500 r/min, and mixed for 0.5 h, thus a second precursor was obtained;

(4) the second precursor was VC hot mixed at 300° C. for 1 h, thus a third precursor was obtained;

(5) the third precursor was placed in a box furnace, argon gas was introduced, the temperature was raised to 900° C. at a temperature raising rate of 1.5° C./min and maintained for 3 h, followed by natural cooling to room temperature, then it was crushed, screened and demagnetized, thus a carbon-based composite material with a particle size of 1-45 μm was obtained, which is a high capacity rate type carbon-based composite anode material and comprises the nano-active substance in a proportion of 16 wt %, the first carbon coating layer in a proportion of 2 wt %, soft carbon in a proportion of 30 wt %, hard carbon in a proportion of 30 wt % and the second carbon coating layer in a proportion of 22 wt %.

Figure 1:
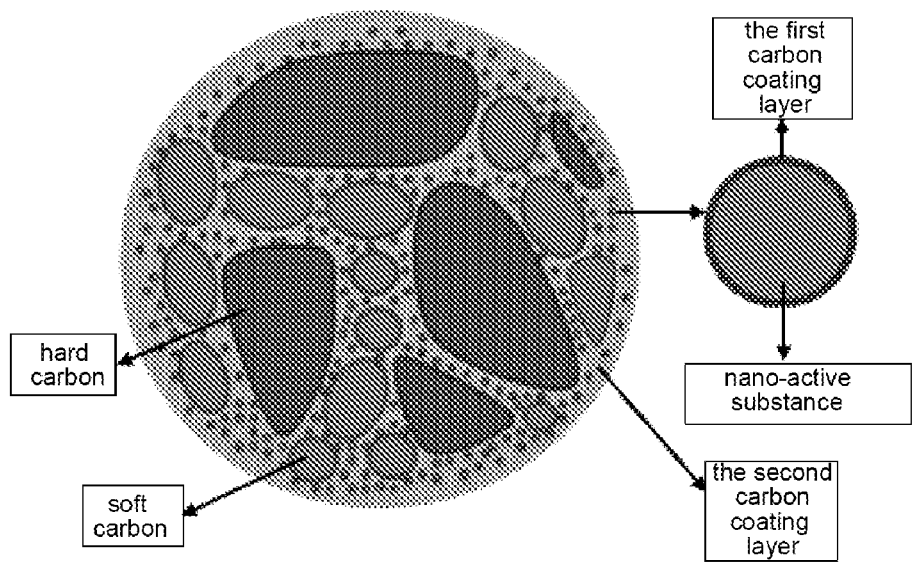
FIG. 1 is a schematic structural view of the carbon-based composite material in Example 1 of the present application.

FIG. 1 is a schematic structural view of the carbon-based composite material in this example. As can be seen from FIG. 1, in this example, the carbon-based composite material comprises a soft carbon (coke), a hard carbon (plant hard carbon), a nano-active substance (Si), a first carbon coating layer and a second carbon coating layer; the first carbon coating layer is coated on the surface of the nano-active substance to form composite particles; the composite particles are dispersed on the surfaces of the soft carbon and the hard carbon and in the second carbon coating layer; and the second carbon coating layer is the outermost layer structure of the carbon-based composite material and is disposed to coat the soft carbon, the hard carbon and the composite particles.

Figure 2:
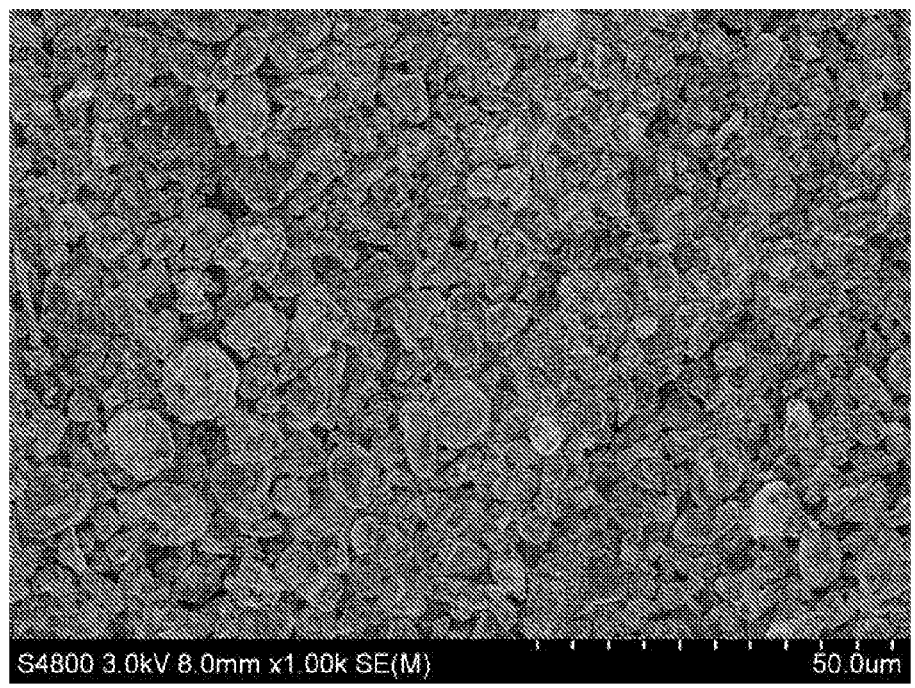
FIG. 2 is a scanning electron microscope image of the carbon-based composite anode material in Example 1 of the present application.

FIG. 2 is a scanning electron microscope image of the carbon-based composite anode material in this example, from which it can be seen that the composite anode material is formed by irregular particles having a median particle diameter of around 12 μm.

Figure 3:
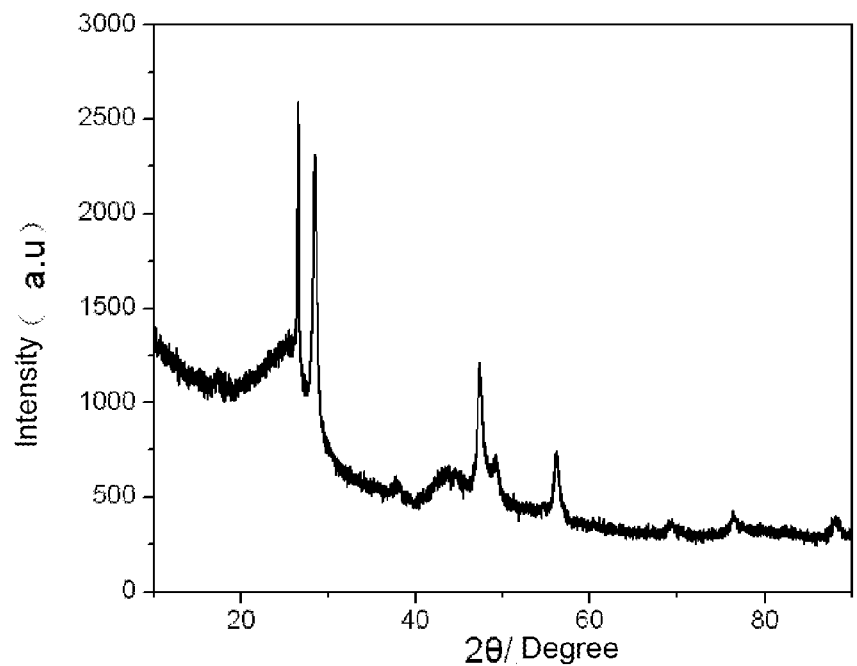
FIG. 3 is an XRD pattern of the carbon-based composite anode material in Example 1 of the present application.

FIG. 3 is an XRD pattern of the carbon-based composite anode material in this example, and characteristic peaks of soft carbon, hard carbon, and nano-silicon can be seen.

Figure 4:
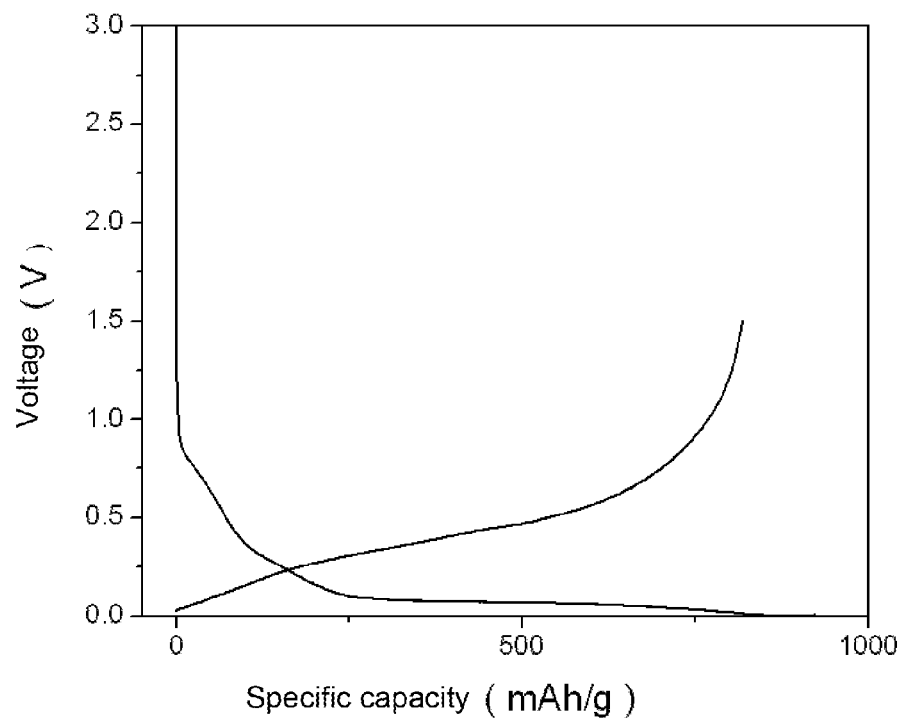
FIG. 4 is a first charge-discharge curve of a battery comprising the carbon-based composite anode material in Example 1 of the present application.

FIG. 4 is a first charge-discharge curve of a battery comprising the carbon-based composite anode material in this example, from which it can be seen that the first reversible capacity is 818.5 mAh/g and the first coulombic efficiency is 88.7%.

Figure 5:
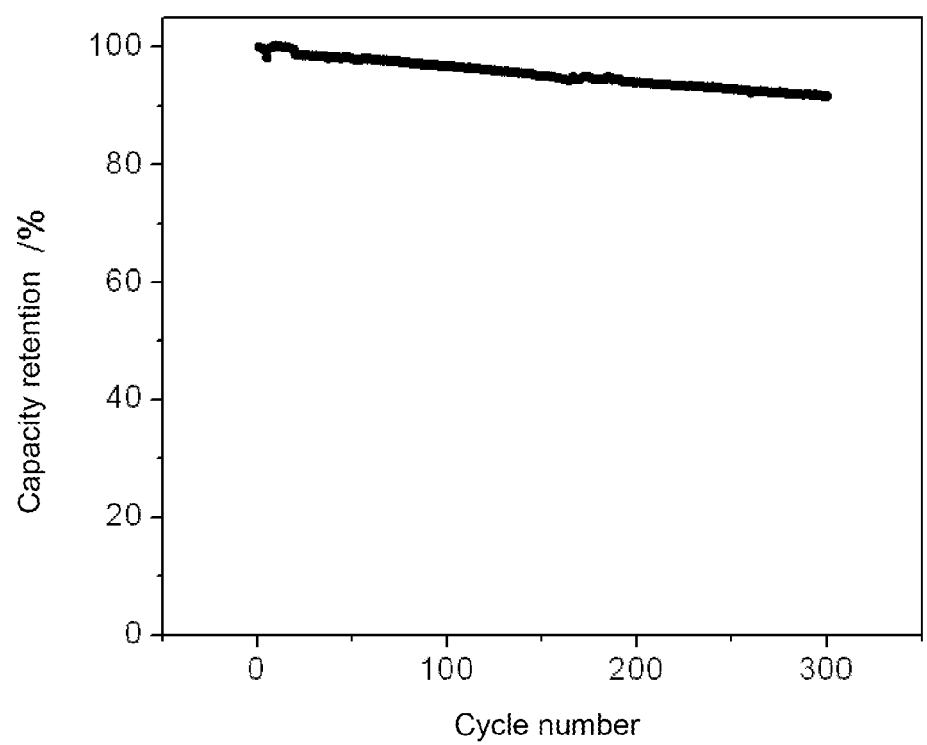
FIG. 5 is a cycle performance curve of a battery comprising the carbon-based composite anode material in Example 1 of the present application.

FIG. 5 is a cycle performance curve of a battery comprising the carbon-based composite anode material in this example, from which it can be seen that the capacity retention is 91.7% after 300 cycles.

EXAMPLE 2

(1) a silicon-iron alloy with a particle size of 120-180 nm was placed in a rotary furnace, the rotary speed was adjusted to be 1.5 r/min, nitrogen gas was introduced, the temperature was raised to 1000° C. at a temperature raising rate of 7° C./min, methane gas was introduced at a flow rate of 2.5 L/min, the temperature was maintained for 0.5 h, followed by natural cooling to room temperature, thus a carbon-coated nano-active substance, namely the composite particles consisting of the nano-active substance and a first carbon coating layer, was obtained;

(2) mesocarbon microbeads with a median particle diameter of 4-7 μm, resin carbon with a median particle diameter of 6-9 μm, the carbon-coated nano-active substance and sodium dodecyl sulfate were dispersed into propyl alcohol in a mass ratio of 43:30:25:2, and the mixture was spray dried, thus a first precursor was obtained;

(3) the first precursor and asphalt powder with a particle size of 1-7 μm were placed in a VC high-efficiency mixer in a mass ratio of 65:35 where the rotating speed was adjusted to be 3000 r/min, and mixed for 1 h, thus a second precursor was obtained;

(4) the second precursor was treated by kneading molding at 350° C. for 0.5 h, thus a third precursor was obtained;

(5) the third precursor was placed in a pipe furnace, nitrogen gas was introduced, the temperature was raised to 750° C. at a temperature raising rate of 3° C./min and maintained for 5 h, followed by natural cooling to room temperature, then it was crushed, screened and demagnetized, thus a carbon-based composite material with a particle size of 1-45 μm was obtained, which is a high capacity rate type carbon-based composite anode material and comprises the nano-active substance in a proportion of 20 wt %, the first carbon coating layer in a proportion of 1.5 wt %, soft carbon in a proportion of 32 wt %, hard carbon in a proportion of 22.5 wt % and the second carbon coating layer in a proportion of 24 wt %. In this example, the carbon-based composite material comprises a soft carbon (mesocarbon microbeads), a hard carbon (resin carbon), a nano-active substance (silicon-iron alloy), a first carbon coating layer and a second carbon coating layer; the first carbon coating layer is coated on the surface of the nano-active substance to form composite particles; the composite particles are dispersed on the surfaces of the soft carbon and the hard carbon and in the second carbon coating layer; and the second carbon coating layer is the outermost layer structure of the carbon-based composite material and is disposed to coat the soft carbon, the hard carbon and the composite particles.

EXAMPLE 3

(1) Si with a particle size of 20-50 nm was placed in a rotary furnace, the rotary speed was adjusted to be 3 r/min, nitrogen gas was introduced, the temperature was raised to 900° C. at a temperature raising rate of 3° C./min, acetone gas was introduced at a flow rate of 7 L/min, the temperature was maintained for 0.2 h, followed by natural cooling to room temperature, thus a carbon-coated nano-active substance, namely the composite particles consisting of the nano-active substance and a first carbon coating layer, was obtained;

(2) carbon fibers with a median particle diameter of 5-8 μm, asphalt hard carbon with a median particle diameter of 5-8 μm, the carbon-coated nano-active substance and a fatty acid polyethylene glycol ester were dispersed into ethyl alcohol in a mass ratio of 45:20:30:5, and the mixture was spray dried, thus a first precursor was obtained;

(3) the first precursor and glucose were dispersed in ethyl alcohol in a mass ratio of 65:35, the mixture was spray dried, thus a second precursor was obtained;

(4) the second precursor was treated by kneading molding at 200° C. for 2 h, thus a third precursor was obtained;

(5) the third precursor was placed in a roller kiln, nitrogen gas was introduced, the temperature was raised to 980° C. at a temperature raising rate of 4° C./min and maintained for 2 h, followed by natural cooling to room temperature, then it was crushed, screened and demagnetized, thus a carbon-based composite material with a particle size of 1-45 μm was obtained, which is a high capacity rate type carbon-based composite anode material and comprises the nano-active substance in a proportion of 28 wt %, the first carbon coating layer in a proportion of 4 wt %, soft carbon in a proportion of 36 wt %, hard carbon in a proportion of 16 wt % and the second carbon coating layer in a proportion of 16 wt %. In this example, the carbon-based composite material comprises a soft carbon (carbon fibers), a hard carbon (asphalt hard carbon), a nano-active substance (Si), a first carbon coating layer and a second carbon coating layer; the first carbon coating layer is coated on the surface of the nano-active substance to form composite particles; the composite particles are dispersed on the surfaces of the soft carbon and the hard carbon and in the second carbon coating layer; and the second carbon coating layer is the outermost layer structure of the carbon-based composite material and is disposed to coat the soft carbon, the hard carbon and the composite particles.

EXAMPLE 4

(1) SnO with a particle size of 150-180 nm was placed in a rotary furnace, the rotary speed was adjusted to be 5 r/min, nitrogen gas was introduced, the temperature was raised to 850° C. at a temperature raising rate of 1° C./min, acetylene gas was introduced at a flow rate of 0.5 L/min, the temperature was maintained for 3 h, followed by natural cooling to room temperature, thus a carbon-coated nano-active substance, namely the composite particles consisting of the nano-active substance and a first carbon coating layer, was obtained;

(2) coke with a median particle diameter of 3-5 μm, organic polymer pyrolytic carbon with a median particle diameter of 9-13 μm and the carbon-coated nano-active substance were placed in a fusion machine in a mass ratio of 25:40:35, the rotating speed was adjusted to be 2000 r/min, the cutter gap width was set to be 0.5 cm, fusion was conducted for 1.5 h, thus a first precursor was obtained;

(3) the first precursor and citric acid were dispersed in ethyl alcohol in a mass ratio of 60:40, the mixture was spray dried, thus a second precursor was obtained;

(4) the second precursor was VC hot mixed at 160° C. for 0.5 h, thus a third precursor was obtained;

(5) the third precursor was placed in a rotary furnace, argon gas was introduced, the temperature was raised to 650° C. at a temperature raising rate of 7° C./min and maintained for 1 h, followed by natural cooling to room temperature, then it was crushed, screened and demagnetized, thus a carbon-based composite material with a particle size of 1-45 μm was obtained, which is a high capacity rate type carbon-based composite anode material and comprises the nano-active substance in a proportion of 26.5 wt %, the first carbon coating layer in a proportion of 1.2 wt %, soft carbon in a proportion of 20 wt %, hard carbon in a proportion of 32 wt % and the second carbon coating layer in a proportion of 20.3 wt %. In this example, the carbon-based composite material comprises a soft carbon (coke), a hard carbon (organic polymer pyrolytic carbon), a nano-active substance (SnO), a first carbon coating layer and a second carbon coating layer; the first carbon coating layer is coated on the surface of the nano-active substance to form composite particles; the composite particles are dispersed on the surfaces of the soft carbon and the hard carbon and in the second carbon coating layer; and the second carbon coating layer is the outermost layer structure of the carbon-based composite material and is disposed to coat the soft carbon, the hard carbon and the composite particles.

EXAMPLE 5

(1) SiO nano-particles with a particle size of 100-130 nm was placed in a rotary furnace, the rotary speed was adjusted to be 1 r/min, argon gas was introduced, the temperature was raised to 1050° C. at a temperature raising rate of 2° C./min, methane gas was introduced at a flow rate of 1 L/min, the temperature was maintained for 1 h, followed by natural cooling to room temperature, thus a carbon-coated nano-active substance, namely the composite particles consisting of the nano-active substance and a first carbon coating layer, was obtained;

(2) coke with a median particle diameter of 7-9 μm, resin carbon with a median particle diameter of 10-13 μm and a carbon-coated nano-active substance were dispersed into propyl alcohol in a mass ratio of 45:30:25, and the mixture was dried by rotary evaporation, thus a first precursor was obtained;

(3) the first precursor and sucrose were placed in a VC high-efficiency mixer in a mass ratio of 60:40 where the rotating speed was adjusted to be 2000 r/min, and mixed for 0.5 h, thus a second precursor was obtained;

(4) the second precursor was VC hot mixed at 200° C. for 1.5 h, thus a third precursor was obtained;

(5) the third precursor was placed in a roller kiln, nitrogen gas was introduced, the temperature was raised to 1050° C. at a temperature raising rate of 5° C./min and maintained for 2 h, followed by natural cooling to room temperature, then it was crushed, screened and demagnetized, thus a carbon-based composite material with a particle size of 1-45 μm was obtained, which carbon-based composite material is a high capacity rate type carbon-based composite anode material and comprises the nano-active substance in a proportion of 18 wt %, the first carbon coating layer in a proportion of 1.6 wt %, soft carbon in a proportion of 35 wt %, hard carbon in a proportion of 23 wt % and the second carbon coating layer in a proportion of 22.4 wt %. In this example, the carbon-based composite material comprises a soft carbon (coke), a hard carbon (resin carbon), a nano-active substance (SiO), a first carbon coating layer and a second carbon coating layer; the first carbon coating layer is coated on the surface of the nano-active substance to form composite particles; the composite particles are dispersed on the surfaces of the soft carbon and the hard carbon and in the second carbon coating layer; and the second carbon coating layer is the outermost layer structure of the carbon-based composite material and is disposed to coat the soft carbon, the hard carbon and the composite particles.

Comparison Example 1

An activated carbon composite anode material was prepared in substantially the same manner as in Example 1, except that: the nano-active substance was not subjected to carbon coating, no hard carbon was added, coating modification was not performed, and VC heating or kneading molding treatment was not performed; and a battery was manufactured in the same manner as in Example 1.

Comparison Example 2

A composite anode material was prepared in substantially the same manner as in Example 1, except that: the nano-active substance was not subjected to carbon coating, a soluble carbon-containing organic binder was used for replacing carbonized hard carbon, and VC heating or kneading molding treatment was not performed; and a battery was manufactured in the same manner as in Example 1.

Comparison Example 3

An activated carbon composite anode material was prepared in substantially the same manner as in Example 1, except that: coke with a median particle diameter of 10-14 μm and plant hard carbon with a median particle diameter of 5-7 μm were used; and a battery was manufactured in the same manner as in Example 1.

Comparison Example 4

An activated carbon composite anode material was prepared in substantially the same manner as in Example 1, except that: coke with a median particle diameter of 3-5 μm and plant hard carbon with a median particle diameter of 11-17 μm were used; and a battery was manufactured in the same manner as in Example 1.

The anode materials of Examples 1-5 and Comparison Examples 1-4 were tested by the following methods:

① For the particle diameter described in the present application, a Malvern laser particle size analyzer MS 2000 was adopted to test the particle diameter range of the material and the average particle diameter of the raw material particles.

② An X-ray diffractometer X' Pert Pro, PANalytical was adopted to test the structure of the material.

③ A Hitachi S4800 scanning electron microscope was adopted to observe the surface topography, the particle size and the like of the sample.

④ The first charge-discharge performance was tested by adopting the following method:

the anode materials from these examples and comparison examples, a conductive agent and a binder in a mass ratio of 95:2:3 were dissolved in a solvent for blending, the resulting mixture slurry was coated on a copper foil current collector, and vacuum dried to obtain an anode plate; then the CR 2016 button cell was assembled from 1 mol/L LiPF6/EC+DMC+EMC (v/v=1:1:1) electrolyte, SK (12 μm) separator, and a housing by using a conventional process.

The charge-discharge test of the button cell was carried out on a LAND cell test system from Wuhan Kingnuo Electronics Co., Ltd. under the condition of normal temperature and of constant current charging and discharging at a rate of 0.1 C, with the charge-discharge voltage being limited to be 0.005-1.5 V.

⑤ the rate and the cycle performance were tested by the following methods:

the anode materials from these examples and comparison examples, a conductive agent and a binder in a mass ratio of 95:2:3 were dissolved in a solvent for blending, the resulting mixture slurry was coated on a copper foil current collector, and vacuum dried to obtain an anode plate; then the 18650 cylindrical single cell was assembled from a ternary cathode plate prepared by a conventional mature process, 1 mol/L LiPF$_6$/EC+DMC+EMC (v/v=1:1:1) electrolyte, SK (12 μm) separator, and a housing by using a conventional production process.

The charge-discharge test of the cylindrical cell was carried out on a LAND cell test system of Wuhan Kingnuo Electronics Co., Ltd. under the condition of normal temperature and of constant current charging and discharging at a rate of 1 C, 10 C and 20 C, with the charge-discharge voltage being limited to be 2.75-4.2 V.

The results of electrochemical tests of the anode materials prepared in Examples 1-5 and Comparison Examples 1-2 are shown in Table 1.

TABLE 1

| Name | First reversible capacity at 0.1 C (mAh/g) | First coulombic efficiency at 0.1 C (%) | 10 C/1 C Capacity retention (%) | 20 C/1 C Capacity retention (%) | Capacity retention at 1 C after 300 cycles (%) |
|---|---|---|---|---|---|
| Example 1 | 818.5 | 88.7 | 98.8 | 97.2 | 91.7 |
| Example 2 | 734.8 | 88.5 | 98.6 | 97.0 | 90.8 |
| Example 3 | 1025.3 | 89.0 | 97.5 | 96.2 | 89.4 |
| Example 4 | 592.2 | 87.2 | 98.0 | 96.9 | 90.2 |
| Example 5 | 646.7 | 87.6 | 98.7 | 97.1 | 91.8 |
| Comparison Example 1 | 870.2 | 88.2 | 96.5 | 93.4 | 64.1 |
| Comparison Example 2 | 823.1 | 80.5 | 96.8 | 94.6 | 77.2 |
| Comparison Example 3 | 803.9 | 88.1 | 97.2 | 95.3 | 87.2 |
| Comparison Example 4 | 811.4 | 88.0 | 97.0 | 95.1 | 85.9 |

In Comparison Example 1, the nano-active material was not subjected to carbon coating, no hard carbon was added, and VC heating or kneading molding treatment was not performed; thereby, the cycle performance was greatly reduced due to severe expansion of the material resulted from the larger expansion of the nano-active material and the accumulation of the nano-active material on the soft carbon surface in large amounts.

In Comparison Example 2, a soluble carbon-containing organic binder was used for replacing carbonized hard carbon, and VC heating or kneading molding treatment was not performed; thereby, more voids were present in interior, and the presence of voids resulted in an increase in side reactions of the material with the electrolyte, and the nano-active material had poor conductivity and an expansion that were not well suppressed, finally resulting in a decrease in first efficiency, and a deterioration in rate and cycle performance.

In Comparison Example 3, the ratio of the median particle diameter of the soft carbon to that of the hard carbon was 1:0.5, the structure was not sufficiently optimized, and the rate and cycle performance were deteriorated.

In Comparison Example 4, the ratio of the median particle diameter of the soft carbon to that of the hard carbon was 1:3.5, the structure was not sufficiently optimized, and the rate and cycle performance were deteriorated.

According to the above experimental results, the high capacity rate type carbon composite anode material prepared by the method of the present application has excellent electrochemical performance, high capacity and first coulombic efficiency, and excellent rate performance.

The applicant declares that the present application illustrates the detailed process equipment and process flow of the present application by the above examples, but the present application is not limited to the above detailed process equipment and process flow, that is, it does not mean that the present application must rely on the above detailed process equipment and process flow in order to be implemented.

What is claimed is:

1. A carbon-based composite material, comprising a micron-sized soft carbon, a micron-sized hard carbon, a nano-active substance, a first carbon coating layer and a second carbon coating layer;
the first carbon coating layer is coated on the surface of the nano-active substance to form composite particles;
the composite particles are dispersed on the surfaces of the soft carbon and the hard carbon and dispersed into the second carbon coating layer;
the second carbon coating layer is disposed to coat the soft carbon, the hard carbon and the composite particles.

2. The carbon-based composite material according to claim 1, wherein the ratio of the median particle diameter of the soft carbon to that of the hard carbon is 1:(1-3).

3. The carbon-based composite material according to claim 1 wherein the carbon-based composite material contains the nano-active substance in a proportion of 1-60 wt %, the first carbon coating layer in a proportion of 0.2-15 wt %, the soft carbon in a proportion of 15-60 wt %, the hard carbon in a proportion of 15-60 wt %, and the second carbon coating layer in a proportion of 5-50 wt %.

4. The carbon-based composite material according to claim 3, wherein the carbon-based composite material contains the nano-active substance in a proportion of 10-50 wt %, the first carbon coating layer in a proportion of 0.5-13 wt %, the soft carbon in a proportion of 20-50 wt %, the hard carbon in a proportion of 20-50 wt %, and the second carbon coating layer in a proportion of 10-40 wt %.

5. The carbon-based composite material according to claim 1, wherein the nano-active material comprises a material that is electrochemically active to lithium.

6. The carbon-based composite material according to claim 1, wherein the nano-active substance comprises any one selected from the group consisting of a silicon elementary substance, a tin elementary substance, an antimony elementary substance, a germanium elementary substance, an aluminum elementary substance, a magnesium elementary substance, a zinc elementary substance, a gallium elementary substance, a cadmium elementary substance, a titanium oxide, a silicon oxide, a tin oxide, a cobalt oxide, an iron oxide, a copper oxide, a manganese oxide, a nickel oxide, a tin-antimony alloy, an indium-antimony alloy, a silver-antimony alloy, an aluminum-antimony alloy, a silver-tin alloy, a silicon-iron alloy, a silicon-magnesium compound, and a silicon-iron compound, or a combination of at least two selected therefrom.

7. The carbon-based composite material according to claim 1, wherein the soft carbon comprises an amorphous carbon material which is configured to be graphitized after heat treatment at 800-3200° C., the amorphous carbon material comprising any one selected from the group consisting of coke, carbon fibers, and mesocarbon microbeads, or a combination of at least two selected therefrom.

8. The carbon-based composite material according to claim 1, wherein the hard carbon comprises an amorphous carbon material which is configured to be graphitized after heat treatment at 800-3200° C., the amorphous carbon material comprising any one selected from the group consisting of a resin carbon, an organic polymer pyrolytic carbon, a plant hard carbon, and an asphalt hard carbon, or a combination of at least two selected therefrom.

9. The carbon-based composite material according to claim 1, wherein the median particle diameter of the carbon-based composite material is 1-45 μm.

10. A lithium ion battery, wherein, the anode active material of the lithium ion battery comprises the carbon-based composite material of claim 1.

\* \* \* \* \*